United States Patent  [11] 3,625,855

| [72] | Inventor | Bernard E. Douda<br>Bloomfield, Ind. |
|---|---|---|
| [21] | Appl. No. | 873,687 |
| [22] | Filed | Nov. 3, 1969 |
| [45] | Patented | Dec. 7, 1971 |
| [73] | Assignee | The United States of America as represented by the Secretary of the Navy |

[54] WHITE SMOKE COMPOSITION
2 Claims, No Drawings

[52] U.S. Cl. .................................................. 252/305,
149/44, 149/37
[51] Int. Cl. ................................................... C06d 3/00,
C09k 3/30
[50] Field of Search ........................................... 252/305;
149/44, 37

[56] References Cited
UNITED STATES PATENTS

| 2,123,201 | 7/1938 | Pritham ....................... | 149/44 |
| 2,939,779 | 6/1960 | Brock ........................... | 149/76 |

Primary Examiner—John D. Welsh
Attorneys—R. S. Sciascia, H. H. Losche and Paul S. Collignon ABSTRACT: A composition having long burning time and producing high volume white smoke and being comprised of between 11 and 13 percent of magnesium, between 44 and 49 percent of zinc oxide, between 25 and 26 percent of a chlorinated organic compound, and between 14 and 22 percent of a nonacid-type binder.

WHITE SMOKE COMPOSITION

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

The present invention relates to a pyrotechnic composition which, upon burning, provides a large volume of white smoke.

Chemicals in the category of screening smokes are those which, when dispersed in air, produce a cloud of finely divided particles of solid, liquid, or both. These are used to shield tactical operations or disrupt the movements of the enemy. Outstanding examples of such materials are: fuel oil used in "artificial fog" generators, white phosphorus, sulfur trioxide, titanium tetrachloride, and so-called zinc chloride smokes. Each of the above-listed smoke-generating compositions is characterized by certain advantages and disadvantages in military operations, depending upon the importance of such factors as mobility of the smoke-producing apparatus, toxicity, logistical considerations, and the total obscuring power of the composition employed.

For military use, volatile hygroscopic chloride (HC) smokes are the most important, other than oil mixtures, which are utilized for large-scale operations. The most widely used HC types of smokes are those resulting in the production of zinc chloride smokes.

The original mixture employed to produce a zinc chloride smoke was the Berger mixture, developed by the French Army during World War I. The original Berger mixture consisted of zinc dust and carbon tetrachloride with zinc oxide and diatomite. Upon ignition, a vigorous reaction takes place, resulting in the formation of zinc chloride, which is volatilized by the heat of the reaction and solidifies to form smoke. However, since this mixture employed a liquid organic chloride, it was difficult to transport and store. By the beginning of World War II, the United States Government had developed a mixture designated "HC smoke mixture" which contained zinc, a perchlorate as an oxidizing agent, hexachloroethane as the organic chloride compound, and a retarder, ammonium chloride. Subsequently, a mixture was found which was better in many ways than the original; it was a combination of hexachloroethane, aluminum and zinc oxide. This mixture required no stabilizer against moisture absorption, and changing the percentage of aluminum varied the burning time, as desired. However, these compositions are corrosive and will interfere with firing mechanisms, thereby materially limiting the storage life of the smoke-generating composition.

SUMMARY OF THE INVENTION

The present invention relates to a pyrotechnic composition which is suitable for making smoke candles by a tamp-cast technique. While most smoke compositions contain aluminum, magnesium is used in the present invention in order to increase the combustibility of the composition. The composition contains zinc oxide, a chlorinated organic compound and a nonacid-type binder. The binder can range from about 5 percent when the composition is to be pressed into a candle and up to about 30 percent when a pour-cast technique is employed. A preferred range of about 13 to 18 percent of binder is employed so that smoke candles can be made by a tamp-cast technique.

DESCRIPTION OF THE PREFERRED EMBODIMENT

In accordance with the present invention, a white smoke composition is provided which contains magnesium, zinc oxide, a chlorinated organic compound and a nonacid-type binder. By way of example, the chlorinated organic compound might be hexachlorobenzene, polyvinyl chloride, perchloropentacyclodecane, or a chlorinated rubber compound. The binder mixture must be a nonacid type for binder systems which are even only slightly acid react with the chlorinated ingredients and cause a gassing reaction to occur. Thus during polymerization, an undesirable swelling takes place. By way of example, suitable binders might be amine cured epoxy systems and epoxy-polyglycol compositions.

The following are examples of compositions according to the present invention.

EXAMPLE I

| | PERCENT (By Weight) |
|---|---|
| Magnesium (granulation 15) | 11 |
| Zinc Oxide | 46 |
| Perchloropentacyclodecane | 25 |
| Polyglycol Resin (QX-3812) | 11.16 |
| Epoxy Resin (D. E. R.-732) | 6.84 |

The magnesium particles were of granulation 15, as defined in Mil-Spec JAN–M–382, entitled, "Magnesium Powder For Use In Ammunition." The polygycol and epoxy resins were obtained from The Dow Chemical Company, Midland, Mich. The epoxy resin used is marketed by The Dow Chemical Company under the trademark D. E. R. 732 and is flexible epoxy resin. The polyglycol resin is a perchlorate-modified amine-terminated long chain polyglycol and The Dow Chemical Company designates the resin as QX-3812. The polyglycol resin is an amber liquid having a specific gravity of 1.05 at 25° C. and has the following analysis:

| | PERCENT (By Weight) |
|---|---|
| Carbon | 59.10 |
| Hydrogen | 10.20 |
| Oxygen | 28.05 |
| Chlorine | 1.36 |
| Nitrogen | 1.29 |

After the ingredients were mixed and blended, the composition was poured and tamped to form a smoke candle about 2.66 inches in diameter and about 11.2 inches long.

The smoke candle weight 1,810 grams and had a density of 1.77 g./cm.³. After curing, the smoke candle was ignited and burned for 540 seconds. A dense, white smoke was produced.

EXAMPLE II

| | PERCENT (By Weight) |
|---|---|
| Magnesium (granulation 15) | 13 |
| Zinc Oxide | Hexachlorobenzene |
| Polyglycol Resin (QX-3812) | 8.68 |
| Epoxy Resin (D. E. R.-732) | 5.32 |

The ingredients were blended as in example I and then tamped to form a smoke candle about 8 inches in diameter and about 5.3 inches long. The smoke candle weighed 7,700 grams and had a density of 1.83 g./cm.³. After curing, the smoke candle was ignited and burned for 407 seconds. A dense, white smoke was produced.

EXAMPLE III

| | PERCENT (By Weight) |
|---|---|
| Magnesium (granulation 15) | 11.2 |

| | |
|---|---|
| Zinc Oxide | 46.5 |
| Polyvinyl chloride | 24.5 |
| Polyglycol Resin (QX-3812) | 11.04 |
| Epoxy Resin (D. E. R.-732) | 6.76 |

The ingredients were blended as in example I and then tamped to form a smoke candle about 4.25 inches in diameter and about 12.88 inches long. The smoke candle weighed 5,690 grams and had a density of 1.90 g./cm.$^3$. After curing, the smoke candle was ignited and burned for 905 seconds. A dense, white smoke was produced.

EXAMPLE IV

| | PERCENT (By Weight) |
|---|---|
| Magnesium (granulation 15) | 10.7 |
| Zinc Oxide | 44.0 |
| Chlorinated Rubber | 23.0 |
| Polyglycol Resin (QX-3812) | 13.83 |
| Epoxy Resin (D. E. R.-732) | 8.47 |

The chlorinated rubber compound which was used is marketed under the trade name Parlon and is a product of Hercules Powder Co., Wilmington, Del. The ingredients were blended as in example I and then tamped to form a smoke candle about 4.25 inches in diameter and about 13.75 inches long. The smoke candle weighed 5,040 grams and had a density of 1.57 g./cm$^3$. After curing, the smoke candle was ignited and burned for 1,245 seconds. A dense, white smoke was produced.

EXAMPLE V

| | PERCENT (By Weight) |
|---|---|
| Magnesium (granulation 15) | 11.60 |
| Zinc Oxide | 48.80 |
| Perchloropentacyclodecane | 25.50 |
| Epoxy Resin | ·9.60 |
| Curing Agent | 4.50 |

The epoxy resin used was a general purpose liquid resin and was obtained from The Dow Chemical Company, Midland, Mich., under the trade name D. E. R. 321. The curing agent was also obtained from The Dow Chemical Company, and was a low viscosity aliphatic diamine which is sold under the trade name D. E. H. 31. The ingredients were blended as in example I and then tamped to form a smoke candle about 2.66 inches in diameter and about 16.50 inches long. The smoke candle weighed 3,580 grams and had a density of 2.36 g./cm.$^3$. After curing, the smoke candle was ignited and burned for 1,170 seconds. A dense, white smoke was produced.

EXAMPLE VI

| | PERCENT (By Weight) |
|---|---|
| Magnesium (granulation 15) | 11.70 |
| Zinc Oxide | 48.80 |
| Perchloropentacyclodecane | 25.70 |
| Epoxy Resin | 7.45 |
| Curing Agent | 6.35 |

The epoxy resin used was a low-viscosity liquid resin obtained from The Dow Chemical Company, Midland, Mich., under the trade name D. E. R. 732. The curing agent was also obtained from The Dow Chemical Company and was a low-viscosity aliphatic diamine which is sold under the trade name D. E. H. 33. The ingredients were blended as in example I and then tamped to form a smoke candle about 2.66 inches in diameter and about 16.75 inches long. The smoke candle weighed 3,540 grams and had a density of 2.32 g./cm.$^3$. After curing, the smoke candle was ignited and burned for 1,305 seconds. A dense, white smoke was produced.

I claim:

1. A substantially homogenous white-smoke-generating composition consisting entirely by weight, of
    between 11 and 13 percent of magnesium,
    between 46 and 49 percent of zinc oxide,
    between 23 and 326 percent of chlorinated organic compound selected from the group consisting of perchloropentacyclodecane, hexachlorobenzene and polyvinyl chloride, and
    between 14 and 22 percent of a resin binder selected from the group of epoxy resin and epoxy-polyglycol resin.

2. A white smoke-generating composition as set forth in claim 1 wherein said epoxy-polyglycol resin is comprised, by weight, of about 62 percent of polyglycol resin and about 38 percent of epoxy resin.

* * * * *

PO-1050
(5/69)

UNITED STATES PATENT OFFICE
CERTIFICATE OF CORRECTION
UNDER RULE 322

Patent No. 3,625,855          Dated December 7, 1971

Inventor(s) BERNARD E. DOUDA

It is certified that error appears in the above-identified patent and that said Letters Patent are hereby corrected as shown below:

Column 2, EXAMPLE II, that portion of the formula reading

"Zinc Oxide             Hexachlorobenzene"

should read

-- Zinc Oxide             47

Hexachlorobenzene      26 --

Column 4, Claim 1, Line 39

"between 23 and 326 percent of chlorinated organic com-"

should read

-- between 23 and 26 percent of chlorinated organic com- --

Column 4, Claim 1, Line 44

"the group of epoxy resin and epoxy-polyglycol resin."

should read

-- the group consisting of epoxy resin and epoxy-polyglycol resin. --

Signed and sealed this 30th day of May 1972.

(SEAL)
Attest:

EDWARD M. FLETCHER, JR.          ROBERT GOTTSCHALK
Attesting Officer                 Commissioner of Patents